US012801859B2

(12) United States Patent

Xu et al.

(10) Patent No.: US 12,801,859 B2

(45) Date of Patent: Nov. 17, 2026

(54) DIALOGUE SYSTEMS USING KNOWLEDGE BASES AND LANGUAGE MODELS FOR AUTOMOTIVE SYSTEMS AND APPLICATIONS

(71) Applicant: NVIDIA Corporation, Santa Clara, CA (US)

(72) Inventors: Peng Xu, Redwood City, CA (US); Mostofa Patwary, Fremont, CA (US); Rajath Shetty, Sunnyvale, CA (US); Niral Lalit Pathak, San Jose, CA (US); Ratin Kumar, Cupertino, CA (US); Bryan Catanzaro, Los Altos Hills, CA (US); Mohammad Shoeybi, Foster City, CA (US)

(73) Assignee: NVIDIA Corporation, Santa Clara, CA (US)

( * ) Notice: Subject to any disclaimer, the term of this patent is extended or adjusted under 35 U.S.C. 154(b) by 176 days.

(21) Appl. No.: 17/947,491

(22) Filed: Sep. 19, 2022

(65) Prior Publication Data

US 2024/0095460 A1 Mar. 21, 2024

(51) Int. Cl.
*G06F 40/35* (2020.01)

(52) U.S. Cl.
CPC .................................... *G06F 40/35* (2020.01)

(58) Field of Classification Search
CPC ........................................................ G06F 40/35
See application file for complete search history.

(56) References Cited

U.S. PATENT DOCUMENTS

| | | | | |
|---|---|---|---|---|
| 8,346,701 B2 * | 1/2013 | Wang | .................... | G06F 16/334 706/46 |
| 8,898,159 B2 * | 11/2014 | Brown | ................ | G06F 16/3329 706/14 |

(Continued)

FOREIGN PATENT DOCUMENTS

| | | |
|---|---|---|
| CN | 113342958 A | 9/2021 |
| CN | 114880444 | 8/2022 |

(Continued)

OTHER PUBLICATIONS

Lewis, et al.; "Retrieval-Augmented Generation for Knowledge-Intensive NLP Tasks," arXiv: 2005.11401, Apr. 12, 2021, 19 pgs.

(Continued)

*Primary Examiner* — Bhavesh M Mehta
*Assistant Examiner* — Nandini Subramani
(74) *Attorney, Agent, or Firm* — IRON SUMMIT IP LLP

(57) ABSTRACT

In various examples, systems and methods that use dialogue systems associated with various machine systems and applications are described. For instance, the systems and methods may receive text data representing speech, such as a question associated with a vehicle or other machine type. The systems and methods then use a retrieval system(s) to retrieve a question/answer pair(s) associated with the text data and/or contextual information associated with the text data. In some examples, the contextual information is associated with a knowledge base associated with or corresponding to the vehicle. The systems and methods then generate a prompt using the text data, the question/answer pair(s), and/or the contextual information. Additionally, the systems and methods determine, using a language model(s) and based at least on the prompt, an output associated with the text data.

22 Claims, 14 Drawing Sheets

(56) References Cited

U.S. PATENT DOCUMENTS

| | | | | |
|---|---|---|---|---|
| 9,085,303 | B2 * | 7/2015 | Wolverton | B60W 50/10 |
| 9,280,908 | B2 * | 3/2016 | Isensee | G09B 7/02 |
| 9,613,025 | B2 * | 4/2017 | Heo | G06F 40/30 |
| 11,474,519 | B2 | 10/2022 | Hicok et al. | |
| 11,506,888 | B2 | 11/2022 | Whitmire et al. | |
| 11,734,319 | B2 * | 8/2023 | Jiang | G06N 5/00 707/769 |
| 11,960,515 | B1 * | 4/2024 | Pallakonda | G06F 16/3329 |
| 2014/0136013 | A1 | 5/2014 | Wolverton et al. | |
| 2018/0032902 | A1 * | 2/2018 | Krishnan | G06N 20/00 |
| 2019/0258939 | A1 * | 8/2019 | Min | G06F 40/30 |
| 2019/0265703 | A1 | 8/2019 | Hicok et al. | |
| 2020/0097544 | A1 * | 3/2020 | Alexander | G06N 3/0895 |
| 2020/0285704 | A1 * | 9/2020 | Rajani | G06N 3/09 |
| 2020/0364303 | A1 | 11/2020 | Liu et al. | |
| 2021/0232613 | A1 * | 7/2021 | Raval Contractor | G06N 5/02 |
| 2022/0026987 | A1 | 1/2022 | Hu et al. | |
| 2023/0133392 | A1 * | 5/2023 | Wang | G06F 40/211 704/9 |

FOREIGN PATENT DOCUMENTS

| | | | |
|---|---|---|---|
| DE | 102016004287 | A1 | 2/2017 |
| WO | 2023172281 | A1 | 9/2023 |

OTHER PUBLICATIONS

Liu, et al.; "Multi-Stage Prompting for Knowledgeable Dialogue Generation," arXiv: 2203.08745, Mar. 16, 2022, 21 pgs.

Xu, Peng; First Office Action for Chinese Patent Application No. 202211614523.6, filed Dec. 13, 2022, mailed Mar. 6, 2026, 14 pgs.

Xu, Peng; First Office Action for Japanese Patent Application No. 2022-164504, filed Oct. 13, 2022, mailed Feb. 27, 2026, 8 pgs.

* cited by examiner

DIALOGUE SYSTEMS USING KNOWLEDGE BASES AND LANGUAGE MODELS FOR AUTOMOTIVE SYSTEMS AND APPLICATIONS

BACKGROUND

Vehicles may be equipped with digital or conversational assistants that can perform various tasks, such as providing information to passengers upon request. For a conversational assistant to operate within a vehicle, the conversational assistant may be preloaded with a set of answers to a set of questions that are commonly asked by passengers. For example, the questions and answers may be determined using an original equipment manufacturer (OEM) manual associated with a model of the vehicle. For example, in anticipation of a driver or passenger(s) asking about a recommended tire pressure for the vehicle, the conversational assistant may be preloaded with question/answer pairs, i.e., specific answers that are mapped to questions. One example may be the question "What tire pressure should I use for the front tires" or "What is the recommended tire pressure." In such an example, the conversational assistant may respond with a pre-mapped answer such as "The recommended tire pressure is thirty-six pounds per square inch," where this answer is taken from the OEM manual and/or created using the OEM manual.

However, since these conversational assistants are preloaded with specific question/answer pairs, various issues may arise. For a first example, a conversational assistant may be unable to correctly interpret a question being asked by a passenger and/or may provide an incorrect answer if the question from the passenger does not match closely enough to one of the preloaded questions. For instance, and using the example above, the conversational assistant may be unable to interpret a question asked by the passenger if the question is "Do you need to keep the tires at a recommended tire pressure?" since this question may not have been preloaded for the conversational assistant. Additionally, since these conversational assistants are preloaded with questions and answers associated with an OEM manual, vehicle manufacturers may be required to generate questions and answers for each type of vehicle (e.g., each year of vehicle, each model of vehicle, etc.). For instance, an OEM manual for a particular model and/or year of vehicle may include different information (e.g., different recommended component parameters, different features, different maintenance schedules, etc.) as compared to another OEM manual for a different model and/or year of vehicle. Moreover, generating these question/answer pairs for comprehensive scenarios and or multiple domains is extremely labor intensive, and may be difficult or unfeasible to scale or adapt across various makes and models of vehicles, or for other use cases and contexts.

SUMMARY

Embodiments of the present disclosure relate to dialogue systems for automotive systems and applications. Systems and methods are disclosed that generate and/or receive audio data (and/or text data corresponding to the audio data) representing speech from a user, where the speech may include a question associated with a vehicle or other machine (e.g., autonomous or semi-autonomous vehicle, construction equipment, landscaping equipment, warehouse vehicles, aircraft, water-based vehicles, etc.). The systems and methods may then use one or more techniques to retrieve information associated with a context of the speech. For a first example, the systems and methods may use a retrieval system(s) to retrieve one or more question/answer pairs associated with the speech, such as from a database(s). For a second example, the systems and methods may use the retrieval system(s) to retrieve contextual information related to the speech, such as contextual information from a (fixed or live) text-based knowledge base—such as a manual, a vehicle manual, a machine manual, a document, etc.—that is stored in the database(s). In either of these examples, the systems and methods of the present disclosure may input data representing the speech, data representing the information associated with the context, and/or other data into a language model(s) (e.g., a large language model(s)). The language model(s) may then process the data and, based on the processing, output data associated with the speech. For example, if the speech includes the question associated with the vehicle, the language model(s) may output information (e.g., an answer) associated with the question. The systems and methods may then provide the information to the user.

In contrast to conventional systems, such as those described above, the current systems, in some embodiments, use a language model(s) (e.g., a large language model(s)) to generate outputs that are more natural, conversational, robust, scalable, and accurate. For instance, and as discussed above, the conventional systems may use digital or conversational assistants that are preloaded with questions and answers, which cause the conventional systems to be limited as to both the questions that may be asked and the information that is provided in response (e.g., limited to the specified questions and answers). In contrast, by using the language model(s), the current systems are not limited to preloaded questions and answers, but may be capable of interpreting questions of various forms and provide unscripted answers in return using data corresponding to a knowledge base. Additionally, for the conventional systems, manufacturers may be required to create a respective conversational assistant for each make, model, and/or year of vehicle or machine. In contrast, the current systems, in some embodiments, use both information retrieved from a database(s) and a language model(s) to generate outputs. As such, the current systems may be used for many different makes, models, and/or years of vehicles or machines.

BRIEF DESCRIPTION OF THE DRAWINGS

The present systems and methods for dialogue systems for automotive systems and applications are described in detail below with reference to the attached drawing figures, wherein.

DETAILED DESCRIPTION

Figure 1:
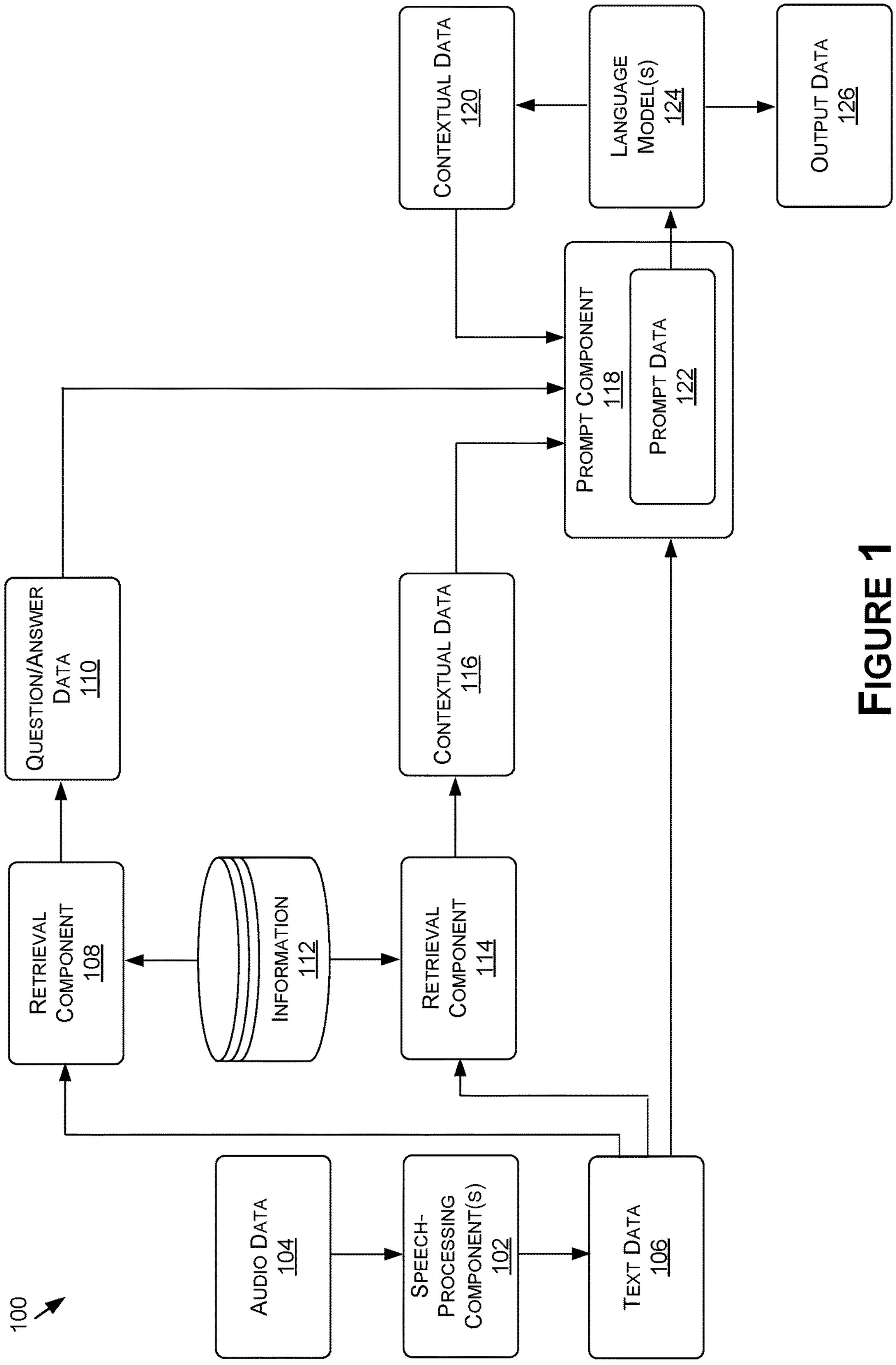
FIG. 1 illustrates an example of using dialogue systems for vehicles and applications, in accordance with some embodiments of the present disclosure.

Systems and methods are disclosed related to dialogue systems for automotive systems and applications. Although the present disclosure may be described with respect to an example autonomous or semi-autonomous vehicle 900 (alternatively referred to herein as "vehicle 900" or "ego-vehicle 900," an example of which is described with respect to FIGS. 9A-9D), this is not intended to be limiting. For example, the systems and methods described herein may be used by, without limitation, autonomous vehicles, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, manned or unmanned drones, and/or other vehicle or machine types. In addition, although the present disclosure may be described with respect to dialogue systems, this is not intended to be limiting, and the systems and methods described herein may be used in augmented reality, virtual reality, mixed reality, robotics, security and surveillance, autonomous or semi-autonomous machine applications, and/or any other technology spaces where dialogue systems may be used.

For instance, a system(s) may receive audio data generated using one or more microphones of a vehicle, where the audio data represents speech (e.g., an utterance) from a user of the vehicle. In some examples, the speech may be associated with a task being requested by the user, such as a request to provide information associated with the vehicle. The system(s) may then process the audio data using a speech-processing model(s) (e.g., an automatic speech recognition (ASR) model(s), a speech to text (STT) model(s), a natural language processing (NLP) model(s), a diarization model, etc.) that is configured to generate text data associated with the audio data. For instance, the text data may represent a transcript (e.g., one or more letters, words, symbols, numbers, etc.) associated with the speech and/or an indication as to which passenger(s)/user(s) is associated with the speech. For example, if the speech is associated with a request for information about the vehicle, such as "What tire pressure should I use for the front tires," then the text data may represent the transcript of the speech. In some examples, the speech-processing model(s) may further generate the text data to represent additional information associated with the speech, such as an intent of the speech (e.g., get tire information) and/or information for a slot(s) (e.g., tire pressure) associated with the intent.

The system(s) may then retrieve additional information associated with the audio data. For example, the system(s) may initially store question/answer pairs within one or more databases or data stores. As described herein, a question/answer pair may include text data representing a question and a corresponding answer. For instance, a question/answer pair may include text data representing a question, such as "What is the recommended tire pressure?" and a corresponding answer, such as "The tire pressure should be set at thirty-six pounds per square inch." In some examples, the question/answer pairs are associated with a vehicle(s), such as one or more components of the vehicle(s), one or more features of the vehicle(s), one or more maintenance schedules associated with the vehicle(s), and/or the like. In some examples, one or more of the question/answer pairs are generally associated with multiple types of vehicles. For instance, one or more of the question/answer pairs may be associated with cars, vans, trucks, vehicle manufacturers, vehicles models, and/or the like. In some examples, one or more of the question/answer pairs may be associated with a specific type of vehicle, such as a specific vehicle manufacturer, a specific vehicle model, and/or a specific vehicle year.

The system(s) may then use a retrieval system(s) to retrieve, from the database(s) (or data stores, or other storage or memory types), one or more question/answer pairs that are related to the text data. In some examples, to retrieve the question/answer pair(s), the question/answer pairs stored within the database(s) may be associated with embeddings. For instance, a first question/answer pair may be associated with a first embedding, a second question/answer pair may be associated with a second embedding, a third question/answer pair may be associated with a third embedding, and/or so forth. As such, the retrieval system(s) may process the text data representing the transcript (e.g., the question) and, based on the processing, generate an embedding for the transcript. The retrieval system(s) may then use the generated embedding to retrieve the question/answer pair(s). For instance, the retrieval system(s) may use the generated embedding and the embeddings associated with the question/answer pairs to determine scores for the question/answer pairs. The retrieval system(s) may then retrieve a threshold number of the question/answer pairs that are associated with the highest score(s). As described herein, the threshold number of question/answer pairs may include, but is not limited to, one question/answer pair, five question/answer pairs, ten question/answer pairs, twenty question/answer pairs, and/or any other number of question/answer pairs.

While this example describes using embeddings to retrieve the question/answer pair(s), in other examples, the retrieval system(s) may use one or more additional and/or alternative techniques. For a first example, the question/answer pairs may be separated into different categories. For instance, if the question/answer pairs are associated with a vehicle(s), then the question/answer pairs may be separated into component categories (e.g., tires, motors, doors, windows, etc.), feature categories (e.g., radios, displays, etc.), maintenance categories (e.g., time periods for recommended maintenance, etc.), and/or any other category. The retrieval system(s) may then use the categories to retrieve a question/answer pair(s) that is in a similar category as the transcript represented by the text data. For a second example, the retrieval system(s) may match one or more words from the transcript represented by the text data to one or more words represented by one or more question/answer pairs. The retrieval system(s) may then retrieve a question/answer pair(s) that includes at least a threshold number (e.g., one, two, three, five, ten, etc.) of matching words.

In some embodiments, in addition to or alternatively from storing and/or retrieving question/answer pairs, the system may store intents, sub-intents, tokens, or other classification types corresponding to different answer types. In such examples, embeddings may be matched to a closest intent (e.g., a "tire pressure intent," a "open gas compartment intent," etc.), and this information may be used to determine an answer. As such, information corresponding to or representing a question and/or answer may be stored, rather than the question/answer pair itself.

In addition to, or as an alternative from, retrieving the question/answer pair(s), the retrieval system(s) may retrieve contextual information associated with the text data. For instance, the system(s) may store information associated with a vehicle(s). In some examples, the information may be associated with a specific type of vehicle, such as a specific vehicle manufacturer, a specific vehicle model, and/or a specific vehicle year. For instance, the information may include text from a fixed or live text-based knowledge base—such as, in vehicle or machine implementations, an original equipment manufacturer (OEM) manual associated with the manufacturer, model, and/or year of the vehicle or machine. In some examples, the information in the knowledge base may generally be associated with multiple types of vehicles. For instance, the information may include text from multiple OEM manuals associated with multiple models of vehicles. Still, in some examples, the information may be from sources other than OEM manuals, such as information from one or more network resources that are accessible to the retrieval system(s).

The retrieval system(s) may then retrieve at least a portion of the information that is associated with the text data. In some examples, to retrieve the portion of the information, and similar to the question/answer pairs above, the information stored within the database(s) may be associated with embeddings. For instance, and as described in more detail herein, a first portion of the information may be associated with a first embedding, a second portion of the information may be associated with a second embedding, a third portion of the information may be associated with a third embedding, and/or so forth. As such, the retrieval system(s) may use the generated embedding and the embeddings associated with the portions of the information to determine scores for the portions of the information. The retrieval system(s) may then retrieve a threshold amount of the information that is associated with the highest score(s). In some examples, the threshold amount of the information may include a threshold number of portions such as, but not limited to, one portion of the information, two portions of the information, five portions of the information, and/or any other number of portions of the information. Additionally, or alternatively, in some examples, the threshold amount of the information may include a threshold number of words such as, but not limited to, one word of the information, ten words of the information, one hundred words of the information, two hundred words of the information, and/or any other number of words of the information While this example describes using embeddings to retrieve the portion(s) of the information, in other examples, the retrieval system(s) may use one or more additional and/or alternative techniques. For a first example, the portions of the information may be separated into different categories. For instance, if the information (from a knowledge base) is associated with an OEM manual of a vehicle, then the portions of the information may be separated into component categories (e.g., tires, motors, doors, windows, etc.), feature categories (e.g., radios, displays, etc.), maintenance categories (e.g., time periods for recommended maintenance, etc.), and/or any other category. The retrieval system(s) may then use the categories to retrieve a portion(s) of the information that is in a similar category as the transcript represented by the text data. For a second example, the retrieval system(s) may match one or more words from the transcript represented by the text data to one or more words represented by one or more portions of the information. The retrieval system(s) may then retrieve a portion(s) of the information that includes at least a threshold number (e.g., one, two, three, five, ten, etc.) of matching words.

The system(s) may then use the text data representing the transcript, data representing the question/answer pair(s), data representing the portion(s) of the contextual information, and/or additional data to generate a prompt associated with the speech. The system(s) may then input, into a language model(s) (e.g., a large language model(s)), prompt data representing the prompt. As described herein, the language model(s) may include any type of language model(s), such as a large language model (LLM), generative language model(s) (e.g., a Generative Pretrained Transformer (GPT), etc.), a representation language model(s) (e.g., a Bidirectional Encoder Representations from Transformers (BERT), etc.), and/or any other type of language model. The language model(s) may then process the prompt data and, based on the processing, output data associated with the speech. For example, if the speech represents a question associated with the vehicle, then the output data may represent information (e.g., an answer) associated with the question. The system(s) may then provide the output to the user, such as by outputting audio associated with the output using one or more speakers.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, dialogue systems, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example of using dialogue systems for automotive or other machine systems and applications, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 900 of FIGS. 9A-9D, example computing device 1000 of FIG. 10, and/or example data center 1100 of FIG. 11.

The process 100 may include one or more speech-processing components 102 processing audio data 104. For instance, the vehicle may generate the audio data 104 using one or more microphone(s), where the audio data 104 represents speech (e.g., an utterance) from a user of the vehicle. In some examples, the speech may represent a task being requested by the user, such as a question about the vehicle. As described herein, when the task includes a question, the question may be associated with a feature (e.g., a radio, a display, etc.) of the vehicle, a component (e.g., a window, a door, a tire, an engine, etc.) of the vehicle, a maintenance schedule associated with the vehicle, and/or any other aspect of the vehicle. The vehicle may then process the audio data 104 using the speech-processing component(s) 102. As described herein, the speech-processing component(s) 102 may include, but is not limited to, one or more ASR models, one or more STT models, one or more NLP models, and/or any other type of speech model.

In some examples, based on the processing, the speech-processing component(s) 102 may generate text data 106 representing one or more words (e.g., a transcript) associated with the speech. For example, if the audio data 104 represents a question that includes "What is the recommended tire pressure?" then the text data 106 may represent text that includes "what is the recommended tire pressure?" In some examples, the speech-processing component(s) 102 may further process the audio data 104 and/or the text data 106 to determine additional information associated with the speech. For instance, the speech-processing component(s) 102 may further determine an intent of the speech and/or information associated with one or more slots or tokens related to the intent. As described herein, an intent may include, but is not limited to, requesting information (e.g., information about a component, a feature, a maintenance schedule, etc.), scheduling an event (e.g., scheduling a maintenance appointment, etc.), and/or the like associated with the vehicle. In some embodiments, the text data may be generated from one or more inputs to a user interface, an input device (e.g., physical or digital keyboard), and/or the like, in addition to or alternatively from being generated based on audio data.

Figure 2:
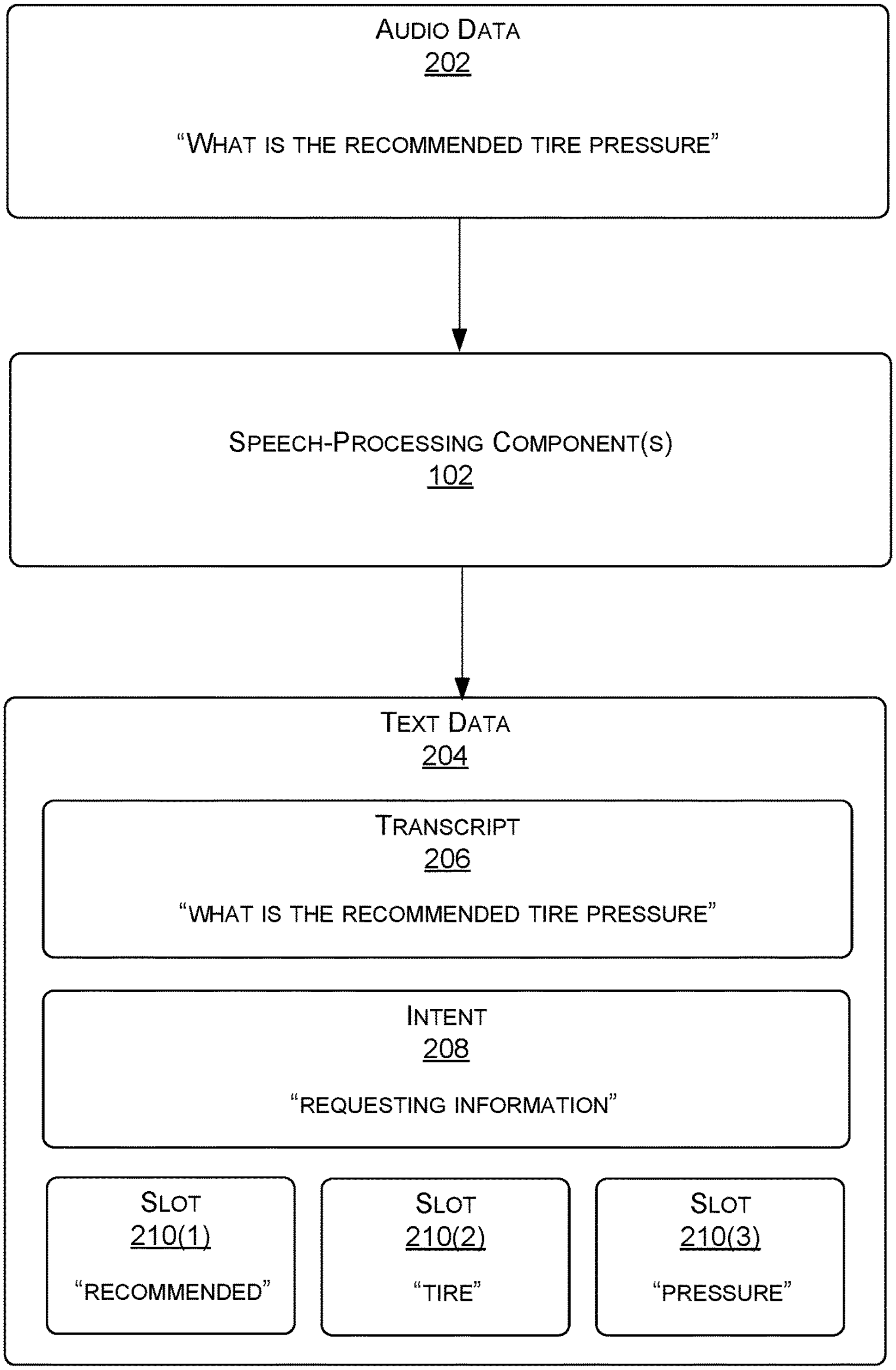
FIG. 2 illustrates an example of processing audio data in order to generate text data representing speech, in accordance with some embodiments of the present disclosure.

For instance, FIG. 2 illustrates an example of the speech-processing component(s) 102 processing audio data 202 (which may represent, and/or include, the audio data 104) in order to generate text data 204 (which may represent, and/or include, the text data 106), in accordance with some embodiments of the present disclosure. As shown, the audio data 104 may represent at least speech from a user, where the speech is a question that includes "What is the recommended tire pressure?" As such, the speech-processing component(s) 102 may process the audio data 202 in order to generate the text data 204. As shown, the text data 204 may represent at least a transcript 206 or diarization of the speech, such as "what is the recommended tire pressure?" In some examples, the text data 204 may further represent an intent 208 associated with the speech, such as "requesting information." In some examples, the text data 204 may further represent information for slots 210(1)-(3) associated with the intent 208, where the information includes "recommended" for the first slot 210(1), "tire" for the second slot 210(2), and "pressure for the third slot 210(3).

Referring back to FIG. 1, the process 100 may include a retrieval component 108 generating question/answer data 110 associated with the text data 106. For instance, an information database(s) 112 may store a number of question/answer pairs. As described herein, the number of question/answer pairs may include, but is not limited to, one question/answer pair, one hundred question/answer pairs, five hundred question/answer pairs, one thousand question/answer pairs, and/or any other number of question/answer pairs. In some examples, the question/answer pairs may be associated with a specific type of vehicle, such as a vehicle manufacturer, a vehicle model, and/or a vehicle year. For instance, the question/answer pairs may be generated using a knowledge base—such as an OEM manual—associated with the vehicle. In some examples, the question/answer pairs may be associated with more than one type of vehicle. For instance, the question/answer pairs may include general questions and answers associated with different vehicle manufacturers, different vehicle models, and/or different vehicle years. Still, in some examples, the question/answer pairs may be associated with topics other than vehicles.

Figure 3:
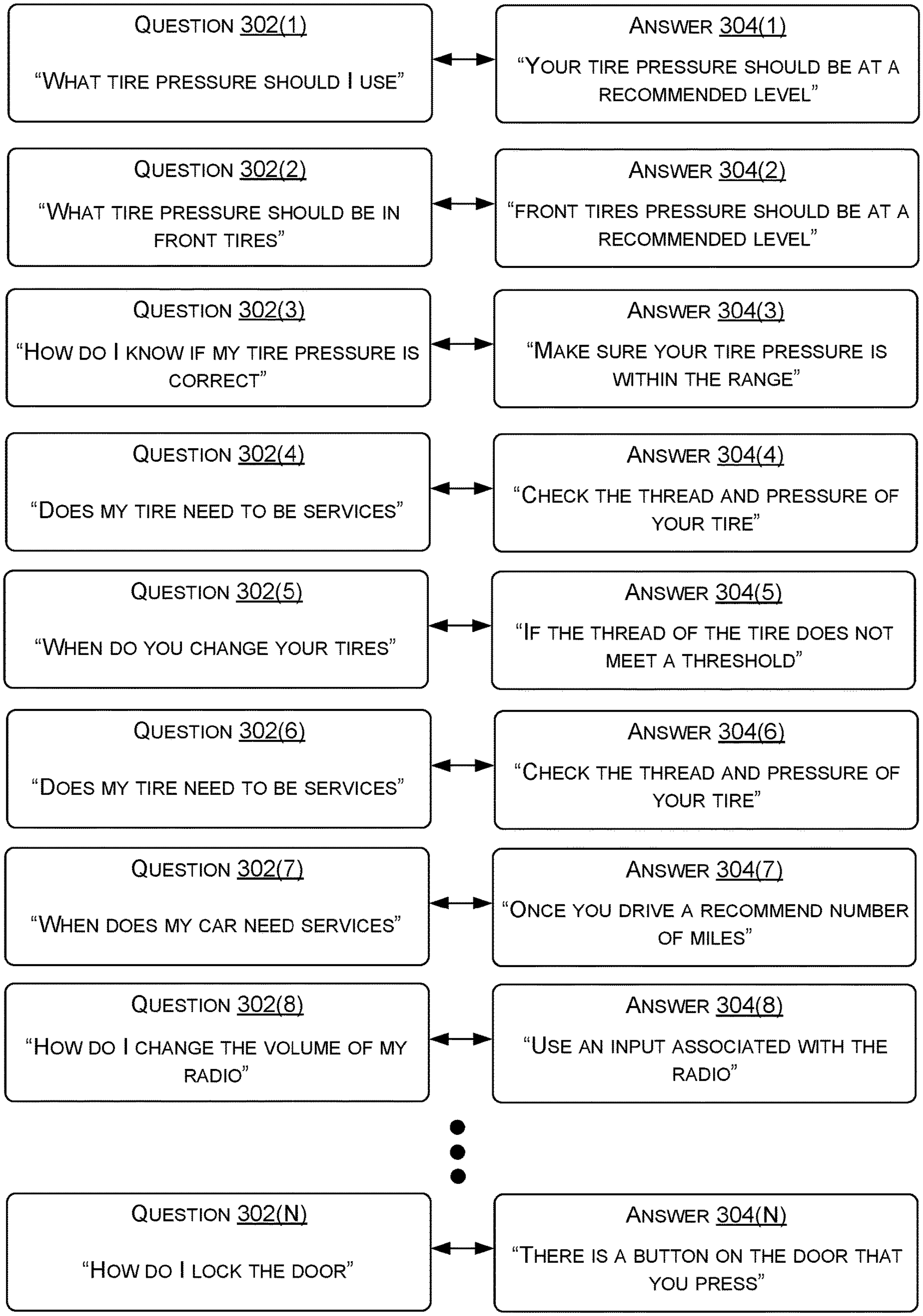
FIG. 3 illustrates an example of question/answer pairs, in accordance with some embodiments of the present disclosure.

For an example of question/answer pairs, FIG. 3 illustrates an example of question/answer pairs for vehicles, in accordance with some embodiments of the present disclosure. As shown, the question/answer pairs may include a number of questions 302(1)-(N) (also referred to singularly as "question 302" or in plural as "questions 302") with corresponding answers 304(1)-(N) (also referred to singularly as "answer 304" or in plural as "answers 304"). While the example of FIG. 3 illustrates that each question 302 includes a corresponding answer 304, in other examples, a question 302 may be associated with more than one answer 304 and/or an answer 304 may be associated with more than one question 302. Additionally, while the example of FIG. 3 illustrates the question/answer pairs being associated with vehicles, in other examples, the question/answer pairs may be associated with any other object type and/or topic.

As described herein, in some examples, the question/answer pairs may be associated with one or more categories. For instance, if the question/answer pairs are associated with vehicles, then the question/answer pairs may be associated with vehicle components (e.g., tires, windows, doors, motors, etc.), vehicle features (e.g., radios, displays, etc.), maintenance schedules associated with the vehicles (e.g., when to get brakes serviced, when to get tires rotated, etc.), and/or the like. For instance, and in the example of FIG. 3, the question/answer pairs include at least six questions 302(1)-(6) with six corresponding answers 304(1)-(6) that are associated with tires and/or tire maintenance. The question/answer pairs further include one question 302(7) with a corresponding answer 304(7) that is associated with general maintenance, one question 302(8) with a corresponding answer 304(8) that is associated with a radio feature, and one question 302(N) with a corresponding answer 304(N) that is associated with a door component.

Referring back to FIG. 1, the retrieval component 108 may use one or more techniques to retrieve, from the information database(s) 112, one or more of the question/answer pairs that are associated with the text data 106. In some examples, a question/answer pair is associated with the text data 106 based on the question/answer pair being related to the same topic, component, feature, and/or the like as the question represented by the text data 106. For instance, and using the example above, if the question requests information associated with tires, then the question/answer pairs that are associated with the question may also include questions associated with tires and/or answers that include information associated with tires. In some examples, the retrieval component 108 may be configured to retrieve a threshold number of question/answer pairs. As described herein, the threshold number of question/answer pairs may include, but is not limited to, one question/answer pair, five question/answer pairs, ten question/answer pairs, twenty question/answer pairs, and/or any other number of question/answer pairs.

Figure 4:
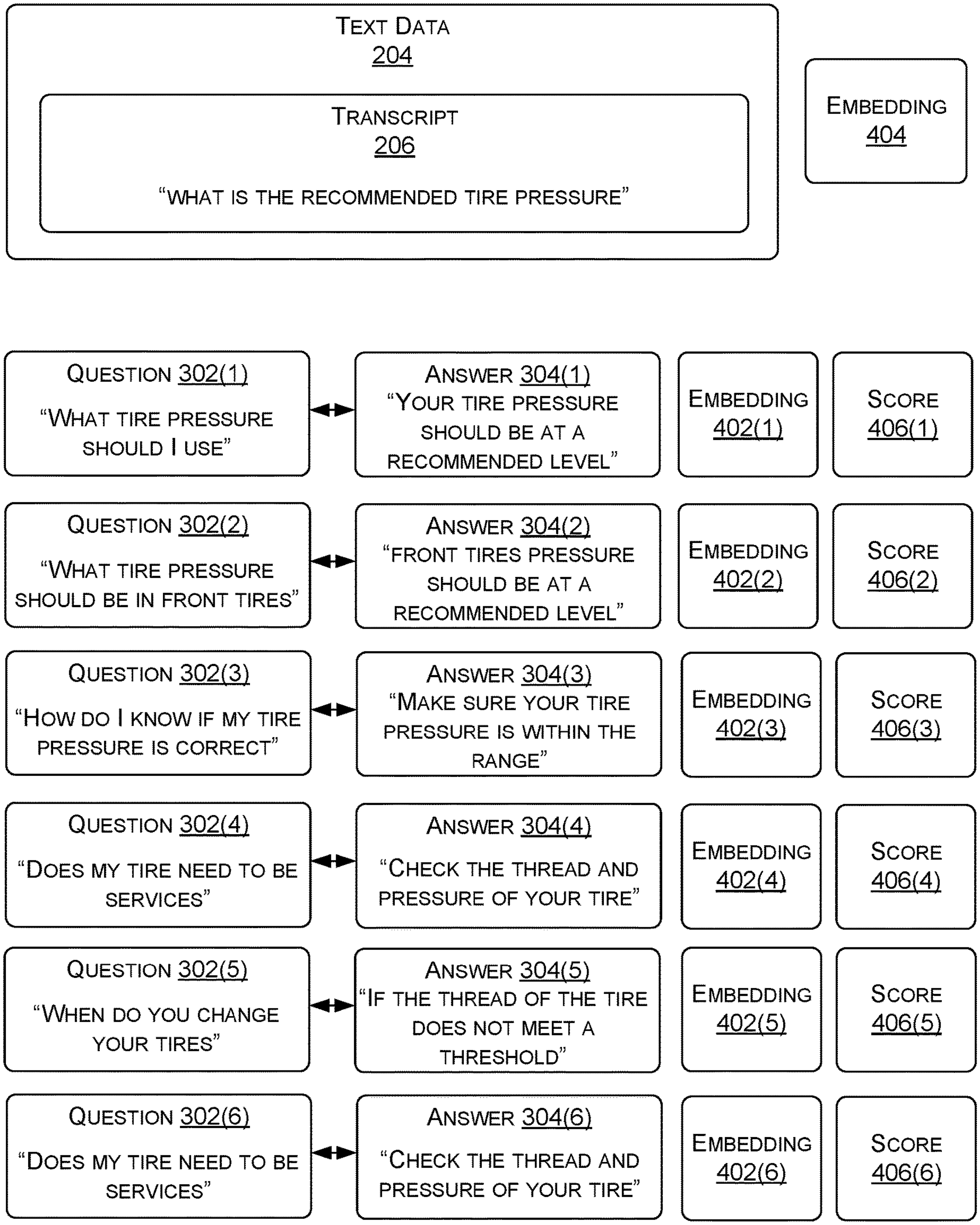
FIG. 4 illustrates an example of retrieving question/answer pairs, in accordance with some embodiments of the present disclosure.

For instance, FIG. 4 illustrates an example of retrieving question/answer pairs, in accordance with some embodiments of the present disclosure. In the example of FIG. 4, the retrieval component 108 may use a type of retrieval technique to retrieve the question/answer pairs, such as, but not limited to, embedding-based retrieval. For instance, and as shown, the question/answer pairs (e.g., from the example of FIG. 3) are associated with embeddings 402(1)-(6) (also referred to singularly as "embedding 402" or in plural as "embeddings 402"). For example, the question/answer pair that includes the question 302(1) and the answer 304(1) is associated with the embedding 402(1), the question/answer pair that includes the question 302(2) and the answer 304(2) is associated with the embedding 402(2), the question/answer pair that includes the question 302(3) and the answer 304(3) is associated with the embedding 402(3), and/or so forth.

In some examples, the retrieval component 108 may generate the embeddings 402 associated with the question/answer pairs. For instance, the retrieval component 108 may include an encoder(s) that transforms the question/answer pairs to dense vectors, where the embeddings 402 are associated with the dense vectors. In some examples, one or more other components and/or systems may generate the embeddings 402 associated with the question/answer pairs. For instance, the one or more other components and/or systems may include the encoder(s) that transforms the question/answer pairs to the dense vectors. In some examples, one or more of the embeddings 402 are generated based on receiving the text data 204 representing the transcript 206. In some examples, one or more of the embeddings 402 are generated before receiving the text data 204 representing the transcript 206.

As further shown by the example of FIG. 4, the retrieval component 108 may further receive and/or generate an embedding 404 associated with the text data 204. For instance, and as described herein, the retrieval component 108 may include an encoder(s) that transforms the text data 204 to a dense vector, where the embedding 404 is associated with the dense vector. The retrieval component 108 may then use the embedding 404 associated with the text data 204 and the embeddings 402 associated with the question/answer pairs (e.g., all the question/answer pairs form the example of FIG. 3, although only six are illustrated for clarity reasons) to retrieve a threshold number of the question/answer pairs. For instance, the retrieval component 108 may use the embedding 404 and the embeddings 402 to identify the question/answer pairs that are the most similar to the transcript 206 represented by the text data 204.

In some examples, to identify the question/answer pairs that are most similar to the transcript 206, the retrieval component 108 may determine scores 406(1)-(6) (also referred to singularly as "score 406" or in plural as "scores 406") for the question/answer pairs using the embedding 404 and the embeddings 402. For instance, the retrieval component 108 may determine the score 406(1) for the question/answer pair that includes the question 302(1) and the answer 304(1) based on the embedding 402(1) and the embedding 404, the score 406(2) for the question/answer pair that includes the question 302(2) and the answer 304(2) based on the embedding 402(2) and the embedding 404, the score 406(3) for the question/answer pair that includes the question 302(3) and the answer 304(3) based on the embedding 402(3) and the embedding 404, and/or so forth. The retrieval component 108 may then select a threshold number of the question/answer pairs that are associated with the highest scores.

For instance, and using the example of FIG. 4, the score 406(3) for the question/answer pair that includes the question 302(3) and the answer 304(3) may include the highest score, the score 406(1) for the question/answer pair that includes the question 302(1) and the answer 304(1) may include the second highest score, the score 406(2) for the question/answer pair that includes the question 302(2) and the answer 304(2) may include the third highest score, the score 406(4) for the question/answer pair that includes the question 302(4) and the answer 304(4) may include the fourth highest score, the score 405(6) for the question/answer pair that includes the question 302(6) and the answer 304(6) may include the fifth highest score, and the score 406(5) for the question/answer pair that includes the question 302(5) and the answer 304(5) may include the sixth highest score. As such, if the retrieval component 108 is configured to select the question/answer pairs associated with the three highest scores (e.g., the threshold number of question/answers pairs is three question/answer pairs), then the retrieval component 108 may select the question/answer pairs that includes the questions 302(1)-(3) and answers 304(1)-(3).

While the example of FIG. 4 illustrates one example technique that the retrieval component 108 may use to retrieve the question/answer pairs, in other examples, the retrieval component 108 may use additional and/or alternative techniques. For a first example, and as described herein, the question/answer pairs may be separated into different categories. For instance, and using the example of FIG. 3, the question/answer pairs may be separated into component categories, such as tires, motor, doors, windows, and/or the like. In such examples, the retrieval component 108 may then use the categories to retrieve a question/answer pair(s) that is in a similar category as the question represented by the text data. For a second example, the retrieval component 108 may match one or more words represented by the text data 204 to one or more words represented by one or more question/answer pairs. The retrieval component 108 may then retrieve a question/answer pair(s) that includes at least a threshold number (e.g., one, two, three, five, ten, etc.) of matching words.

Referring back to the example of FIG. 1, the process 100 may include the retrieval component 108 generating the question/answer data 110 that represents the retrieved question/answer pair(s) from the information database(s) 112. In some examples, the question/answer data 110 may further represent the relevance of the question/answer pair(s) to the text data 106. For example, if the question/answer data 110 represents multiple question/answer pairs, then the question/answer data 110 may indicate that a first question/answer pair is most relevant to the text data 106 (e.g., includes the highest score), a second question/answer pair is the second most relevant to the text data 106 (e.g., includes the second highest score), a third question/answer pair is the third most relevant to the text data 106 (e.g., includes the third highest score), and/or so forth.

The process 100 may include a retrieval component 114 generating contextual data 116 associated with the text data 106. For instance, the information database(s) 112 may further store information associated with a vehicle(s). In some examples, the information may be associated with a specific type of vehicle, such as a vehicle manufacturer, a vehicle model, and/or a vehicle year. For instance, the information may include text from a knowledge base (e.g., manual, document, webpage, etc.) associated with the vehicle. In some examples, the information may generally be associated with multiple types of vehicles. For instance, the information may include text from multiple OEM manuals associated with multiple models of vehicles. In some examples, the information may include information from sources other than OEM manuals, such as information from one or more network resources that are accessible to the retrieval component 114. Still, in some examples, the information may be associated with topics other than vehicles.

The retrieval component 114 may use one or more techniques to retrieve, from the information database(s) 112 (or data store, or other memory or storage type), contextual information that is associated with the text data 106. In some examples, the contextual information is associated with the text data 106 based on the contextual information being related to the same topic, component, feature, and/or the like as the question represented by the text data 106. For instance, and using the example, if the question requests information associated with tires, then the contextual information that is associated with the question may include information associated with tires. In some examples, the retrieval component 114 may be configured to retrieve a threshold amount of the contextual information. As described herein, the threshold amount may include, but is not limited to, one word, ten words, one hundred words, two hundred words, and/or any other amount of the contextual information.

Figure 5:
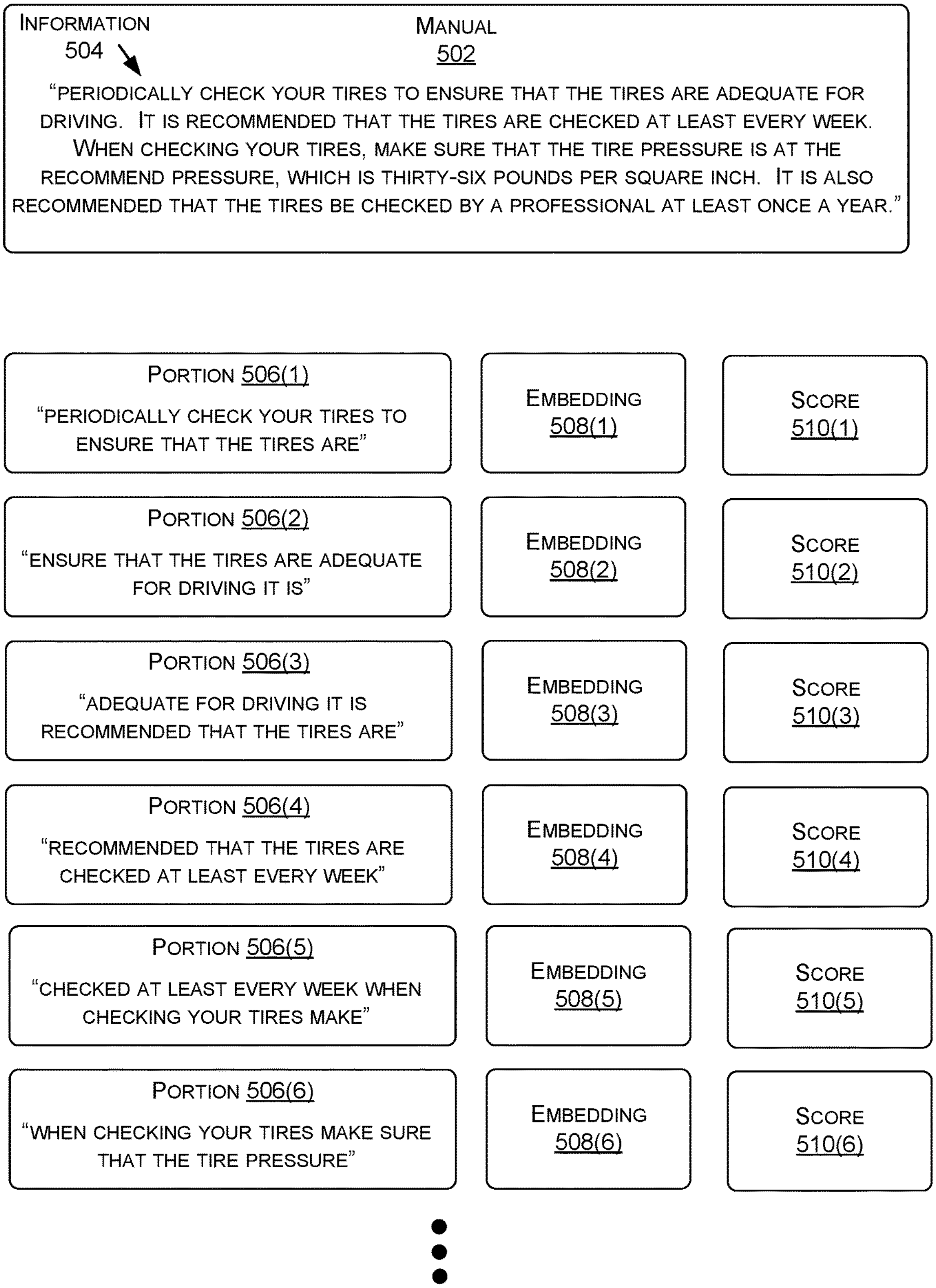
FIG. 5 illustrates an example of retrieving contextual information, in accordance with some embodiments of the present disclosure.

For instance, FIG. 5 illustrates an example of retrieving contextual information, in accordance with some embodiments of the present disclosure. In the example of FIG. 5, the contextual information is associated with an OEM manual 502 of the vehicle, however, in other examples, the contextual information may be associated with any other knowledge base or source of information. Additionally, in the example of FIG. 5, the retrieval component 114 may use a type of retrieval to retrieve the contextual information, such as, but not limited to, embedding-based retrieval.

For instance, and as shown, information 504 from the OEM manual 502 is separated into portions 506(1)-(6) (also referred to singularly as "portion 506" or in plural as "portions 506"). Each of the portions 506 may include a set number of words. While the example of FIG. 5 illustrates each portion 506 as including ten words, in other examples, each portion 506 may include any other number of words (e.g., one word, ten words, fifty words, one hundred words, two hundred words, etc.). Additionally, each portion 506 begins with a set number of words from the previous portion 506, such as by using a "rolling" method. For instance, in the example of FIG. 5, each portion 506 starts five words after the previous portion 506. However, in other examples, each portion 506 may start any number of words after the previous portion (e.g., one word, ten words, fifty words, one hundred words, two hundred words, etc.).

While the example of FIG. 5 illustrates generating the portions 506 based on the number of words, in other examples, the portions 506 may be generated using one or more additional and/or alternative techniques. For instance, in some examples, each portion 506 may be associated with a part of the OEM manual 502. For instance, a portion 506 may be associated with a tires part of the OEM manual 502, a portion 506 may be associated with a windows part of the OEM manual 502, a portion 506 may be associated with an engine part of the OEM manual 502, and/or so forth.

In some examples, the retrieval component 114 may be configured to generate the portions 506 for the information 504. For example, the retrieval component 114 may analyze the information 504 from the manual 502 and, based on the analysis, generate the portions 506. In some examples, one or more other components and/or systems may generate and then store the portions 506 for the information 504.

As further illustrated in the example of FIG. 5, the portions 506 are associated with embeddings 508(1)-(6) (also referred to singularly as "embedding 508" or in plural as "embeddings 508"). For instance, the portion 506(1) is associated with the embedding 508(1), the portion 506(2) is associated with the embedding 508(2), the portion 506(3) is associated with the embedding 508(3), and/or so forth. In some examples, the retrieval component 114 may generate the embeddings 508 associated with the portions 506. For instance, the retrieval component 114 may include an encoder(s) that transforms the words from the portions 506 to dense vectors, where the embeddings 508 are associated with the dense vectors. In some examples, one or more other systems and/or components may generate the embeddings 508 associated with the portions 506. For instance, the one or more other systems and/or components may include the encoder(s) that transforms the portions 506 to the dense vectors. In some examples, one or more of the embeddings 508 are generated based on receiving the text data 204 representing the transcript 206. In some examples, one or more of the embeddings 508 are generated before receiving the text data 204 representing the transcript 206.

The retrieval component 114 may then use the embedding 404 associated with the text data 204 and the embeddings 508 to select one or more portions 506 of the information 504. In some examples, the retrieval component 114 selects a threshold number of the portions 506. The threshold number may include, but is not limited to, one portion 506, two portions 506, five portions 506, ten portions 506, and/or any other number of portions 506. In some examples, the retrieval component 114 selects portions 506 until reaching a threshold number of characters and/or words. For instance, the threshold number of words may include, but is not limited to, ten words, fifty words, one hundred words, two hundred words, and/or any other number of words.

The retrieval component 114 may use the embedding 404 and the embeddings 508 to select a portion(s) 506 of the information 504 that is most similar to the transcript 206 of the text data 204. In some examples, to select the portion(s) 506 that is most similar to the transcript 206, the retrieval component 114 may determine scores 510(1)-(6) (also referred to singularly as "score 510" or in plural as "scores 510") for the portions 506 using the embedding 508 and the embedding 404. For instance, the retrieval component 114 may determine the score 510(1) for the portion 506(1) based on the embedding 508(1) and the embedding 404, the score 510(2) for the portion 506(2) based on the embedding 508(2) and the embedding 404, the score 510(3) for the embedding 508(3) based on the embedding 508(3) and the embedding 404, and/or so forth. The retrieval component 114 may then select the portion(s) 506 based on the scores 510.

For instance, in examples where the retrieval component 114 only selects one of the portions 506, then the retrieval component 114 may select the portion 506 that is associated with the highest score 510. For example, if the retrieval component 114 determines that the score 510(6) includes the highest score 510, then the retrieval component 114 may select the portion 506(6) of the information 504. Additionally, in examples where the retrieval component 114 selects more than one of the portions 506, such as a set number of the portions 506, the retrieval component 114 may select the set number of the portions 506 that include the highest scores 510. For example, if the retrieval component 114 selects two portions 506, the retrieval component 114 may select the portions 506(5)-(6) based on determining that the scores 510(5)-(6) includes the two highest scores 510.

While the example of FIG. 5 illustrates one example technique that the retrieval component 114 may use to retrieve the contextual information, in other examples, the retrieval component 114 may use additional and/or alternative techniques. For a first example, and as described herein, the information may be separated into different categories. For instance, and using the example of FIG. 5 where the information 504 is from the OEM manual 502, the information 504 may be separated into component categories, such as tires, motor, doors, windows, and/or the like. In such examples, the retrieval component 114 may use the categories to retrieve contextual information that is in a similar category as the transcript 206 represented by the text data 204. For a second example, the retrieval component 114 may match one or more words represented by the text data 204 to one or more words represented by the information 504. The retrieval component 114 may then retrieve contextual information that includes at least a threshold number (e.g., one, two, three, five, ten, etc.) of matching words.

Referring back to the example of FIG. 1, the process 100 may include a prompt component 118 using the text data 106, the question/answer data 110, the contextual data 116, and/or additional contextual data 120 to generate prompt data 122 associated with the audio data 104. For instance, the prompt component 118 may generate a prompt using at least the question represented by the text data 106, the retrieved question/answer pair(s) represented by the question/answer data 110, and the retrieved contextual information represented by the contextual data 116. In some examples, the prompt component 118 may be configured to generate the prompt by ordering the text from the text data 106, the text from the question/answer data 110, and the text from the contextual data 116 using a given order.

Figure 6:
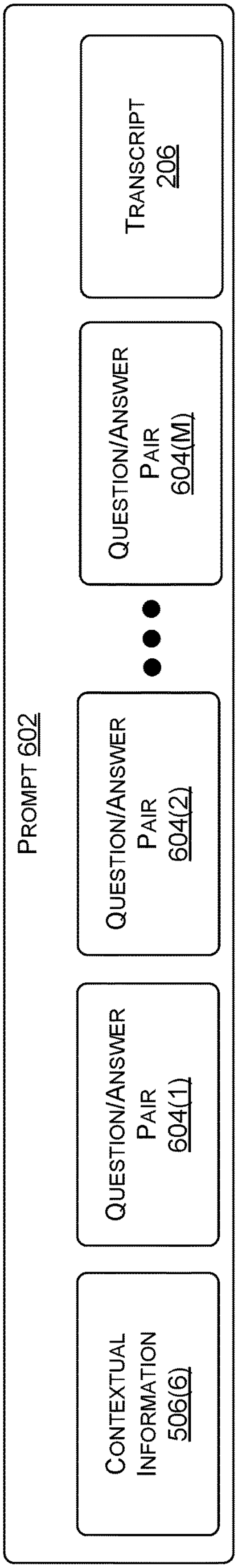
FIG. 6 illustrates an example of generating a prompt using a question, a question/answer pair(s), and contextual information, in accordance with some embodiments of the present disclosure.

For instance, FIG. 6 illustrates an example of generating a prompt 602 using the text data 106, the question/answer data 110, and the contextual data 116, in accordance with some embodiments of the present disclosure. As shown, the prompt 602 may begin with the contextual information associated with the portion 506(6) of the information 504 that was retrieved by the retrieval component 114. The prompt 602 may then include question/answer pairs 604(1)-(M) (also referred to singularly as "question/answer pair 604" or in plural as "question/answer pairs 604") (which may represent the question/answer pairs from the example of FIG. 3) that were retrieved by the retrieval component 108. In some examples, the question/answer pairs 604 are arranged based on the relevance to the text data 204. For a first example, the question/answer pairs 604 may be arranged such that the question/answer pair 604 with the highest score is first, followed by the question/answer pair 604 with the second highest score, followed by the question/answer pair 604 with the third highest score, and/or so forth. For a second example, the question/answer pairs 604 may be arranged such that the question/answer pair 604 with the lowest score is first, followed by the question/answer pair 604 with the second lowest score, followed by the question/answer pair 604 with the third lowest score, and/or so forth. The prompt 602 may then include the transcript 206 associated with the text data 204 (e.g., the question). While this is just one example arrangement for the information included in the prompt 602, in other examples, the prompt 602 may include any other arrangement for the information.

Additionally, in some examples, the prompt 602 may include additional characters, symbols, and/or words that separate the different types of information. For instance, the prompt 602 may (1) begin with the word "context," (2) followed by a colon, (3) followed by the contextual information, (4) followed by two lines, (5) followed by the word "question," (6) followed by a colon, (7) followed by a question, (8) followed by a line, (9) followed by an answer, (10) followed by a colon, (11) where (4)-(10) repeat for each question/answer pair, (12) followed by the transcript. While this is just one example technique for using additional characters, symbols, and/or words to separate the different types of information, in other examples, the prompt component 118 may use one or more additional and/or alternative techniques.

Referring back to the example of FIG. 1, the process 100 may include inputting the prompt data 122 into a language model(s) 124. As described herein, the language model(s)

124 may include any type of language model(s), such as, but not limited to, a generative language model(s) (e.g., a GPT(s), etc.), a representation language model(s) (e.g., a BERT(s), etc.), and/or any other type of language model. The language model(s) 124 may be configured to process the prompt data 122 and, based on the processing, the language model(s) 124 may output data 126 associated with audio data 104 (e.g., associated with the question). For instance, if the audio data 104 represents speech that includes a question about a component of the vehicle, then the output data 126 may represent information about the component of the vehicle.

As further shown, the language model(s) 124 may further output contextual data 120, which, in some examples, may include at least a portion of the output data 126. As discussed herein, the prompt component 118 may further use at least a portion of the contextual data 120 to generate the prompt data 122. For example, if the user continues to ask questions associated with the vehicle, the prompt component 118 may use the contextual data 120 to continue generating the prompt data 122 for the questions, where the contextual data 120 represents a context associated with outputs to previous questions.

In some examples, one or more techniques may be used to determine whether the dialogue system associated with the process 100 is accurate. For instance, an initial set of question/answer pairs may be generated, where a first portion of the initial set of question/answer pairs is associated with reference question/answer pairs and a second portion of the initial set of question/answer pairs is associated with testing question/answer pairs. For example, if the initial set of question/answer pairs includes five hundred question/answer pairs, then four hundred of the question/answer pairs may be associated with reference question/answer pairs and one hundred of the question/answer pairs may be associated with testing or validation question/answer pairs. The reference question/answer pairs may then be stored in the information database(s) 112 and used to perform the processes described herein. Additionally, the testing question/answer pairs may be used to test the system(s).

For instance, the system(s) may perform the process 100 of FIG. 1 using a question from a testing question/answer pair (e.g., the text data 106 may represent the question). Based on performing the process 100, the language model(s) 124 may generate output data 126 associated with the question. The system(s) may then compare the answer from the testing question/answer pair to the answer represented by the output data 126. Additionally, the system(s) may perform a similar process for one or more of the other testing question/answer pairs. Based on the comparison(s), the system(s) may determine an accuracy associated with the dialogue system. Additionally, the system(s) may perform one or more processes based on the accuracy.

For instance, if the system(s) determines that the dialogue system is accurate, then the system(s) may determine that the information (e.g., the reference question/answer pairs, the information used to obtain the contextual information, etc.) stored in the information database(s) 112 and/or the technique(s) used to generate the prompt data 122 causes the dialogue system to be accurate. However, if the system(s) determines that the dialogue system is inaccurate, then the system(s) may update the information (e.g., the reference question/answer pairs, the information used to obtain the contextual information, etc.) stored in the information database(s) 112 and/or the technique(s) used to generate the prompt data 122. In some examples, the system(s) may make such updates in order to make the dialogue system more accurate.

While the example of FIG. 1 illustrates the retrieval component 108 being separate from the retrieval component 114, in other examples, the retrieval component 108 and the retrieval component 114 may include a single component that performs the processes of the retrieval components 108, 114 described herein. Additionally, the retrieval components 108, 114 may include any type of component(s), system(s), application(s), and/or the like that is configured to search for and/or retrieve information from the information database(s) 112.

Figure 7:
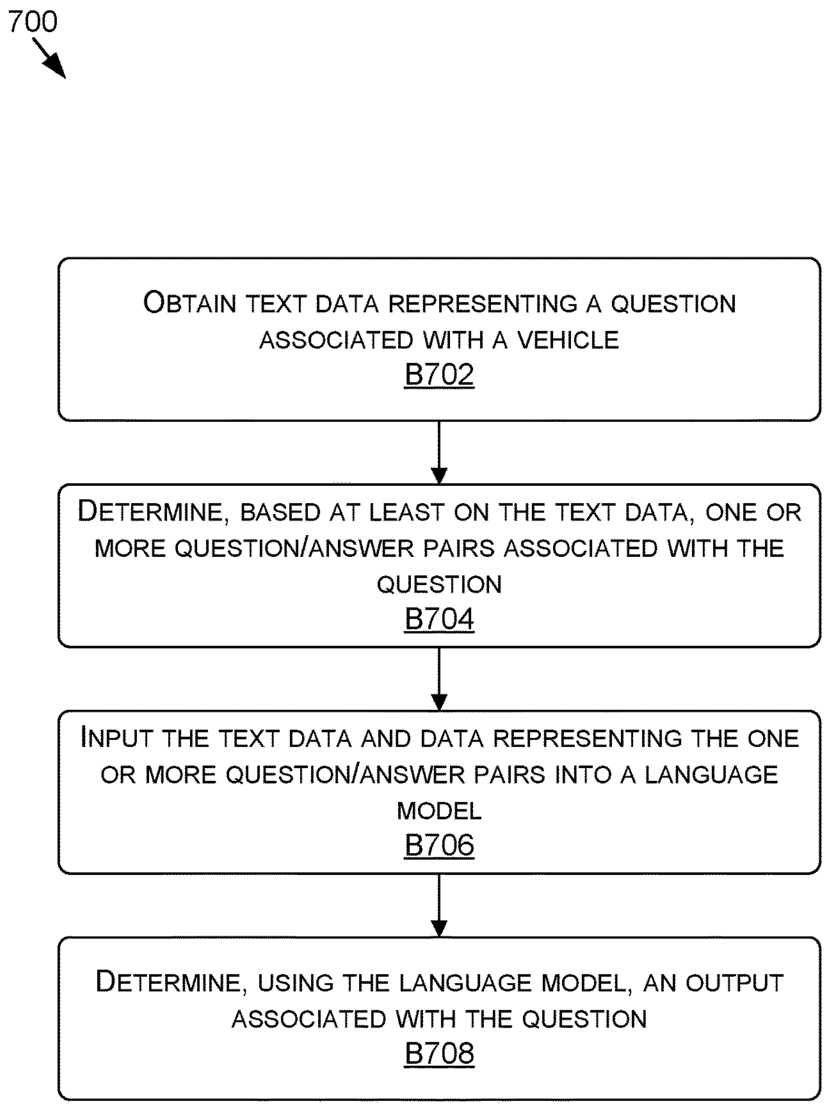
FIG. 7 is a flow diagram showing a method for using a question and a corresponding question/answer pair(s) to determine information associated with a vehicle, in accordance with some embodiments of the present disclosure.
Figure 8:
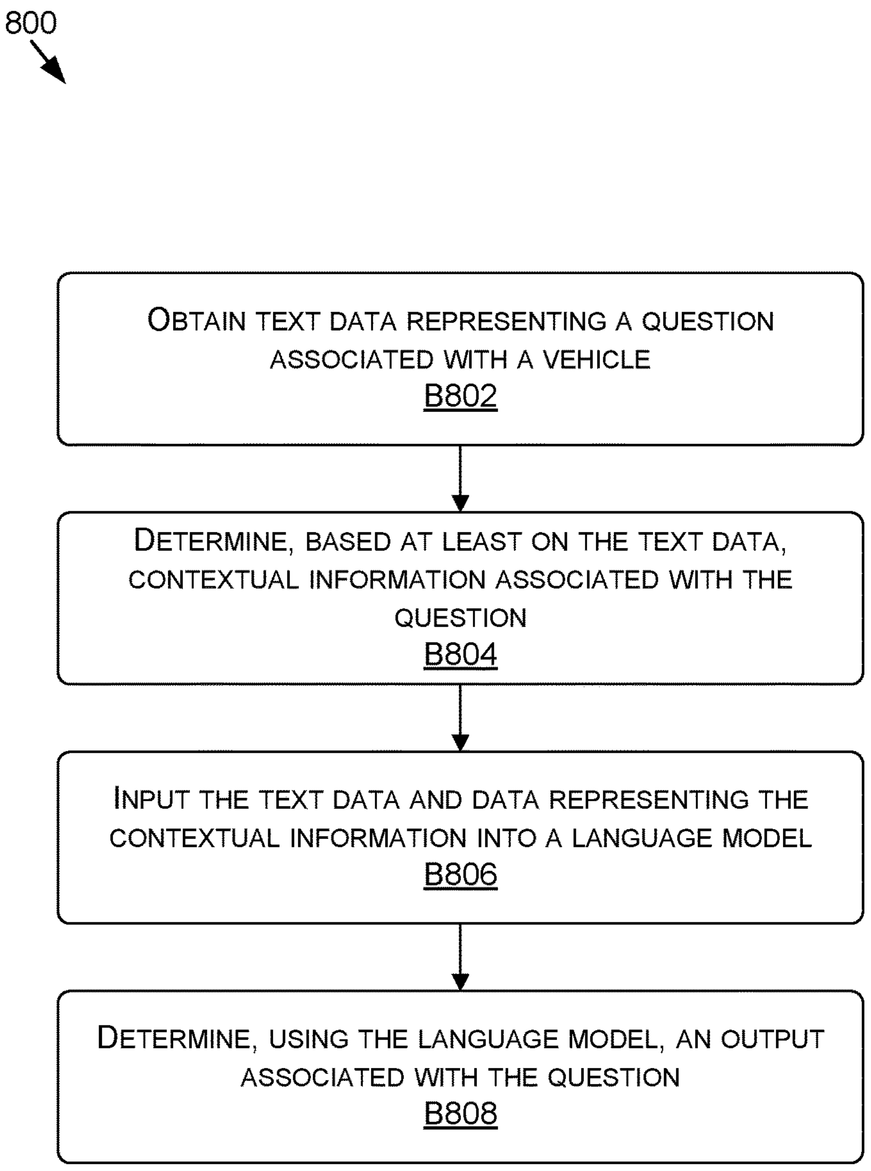
FIG. 8 is a flow diagram showing a method for using a question and corresponding contextual information to determine information associated with a vehicle, in accordance with some embodiments of the present disclosure.

Now referring to FIGS. 7-8, each block of methods 700 and 800, described herein, comprises a computing process that may be performed using any combination of hardware, firmware, and/or software. For instance, various functions may be carried out by a processor executing instructions stored in memory. The methods 700 and 800 may also be embodied as computer-usable instructions stored on computer storage media. The methods 700 and 800 may be provided by a standalone application, a service or hosted service (standalone or in combination with another hosted service), or a plug-in to another product, to name a few. In addition, methods 700 and 800 are described, by way of example, with respect to the system of FIG. 1. However, these methods 700 and 800 may additionally or alternatively be executed by any one system, or any combination of systems, including, but not limited to, those described herein.

FIG. 7 is a flow diagram showing a method 700 for using a question and a corresponding question/answer pair(s) to determine information associated with a vehicle, in accordance with some embodiments of the present disclosure. The method 700, at block B702, may include obtaining text data representing a question associated with a vehicle. For instance, the vehicle may use one or more microphones to generate audio data 104 representing speech from a passenger of the vehicle. The vehicle may then process the audio data 104, using the speech-processing component(s) 102, in order to generate the text data 106 representing the speech. In some examples, the speech may include a question associated with the vehicle. For instance, the speech may include a question associated with a component of the vehicle, a feature of the vehicle, maintenance associated with the vehicle, and/or the like.

The method 700, at block B704, may include determining, based at least on the text data, one or more question/answer pairs associated with the question. For instance, the vehicle may use the retrieval component 108 to retrieve the question/answer pair(s) associated with the question. As described herein, in some examples, the retrieval component 108 may use embeddings associated with the question/answer pairs stored in the information database(s) 112 and an embedding associated with the question to retrieve the question/answer pair(s) that are relevant to the question. However, in other examples, the retrieval component 108 may use one or more additional and/or alternative techniques to retrieve the question/answer pair(s) from the information database(s) 112. The retrieval component 108 may then generate question/answer data 110 representing the retrieved question/answer pair(s).

The process 700, at block B706, may include inputting the text data and data representing the one or more question/answer pairs into a language model. For instance, the vehicle may input the text data 106 and the question/answer data 110 into the language model(s) 124. In some examples, to input the data, the prompt component 118 may initially use the text data 106 and the question/answer data 110 to generate a prompt. The prompt component 118 may then input prompt data 122 representing the prompt into the language model(s) 124. In some examples, the vehicle may input additional data into the language model(s) 124, such as contextual data 116 generated by the retrieval component 114 and/or contextual data 120 previously output by the language model(s) 124.

The method 700, at block B708, may include determining, using the language model, an output associated with the question. For instance, the language model(s) 124 may process the text data 106 and the question/answer data 110 (e.g., the prompt data 122) and, based on the processing, output data 126 associated with the question. As described herein, the output data 126 may represent information associated with the question. The vehicle may then provide the information to the passenger. In some examples, the vehicle provides the information by outputting sound associated with the output data 126, where the sound includes one or more words representing the information. In some examples, the vehicle provides the information by displaying content associated with the output data 126, where the content includes one or more words representing the information.

FIG. 8 is a flow diagram showing a method 800 for using a question and corresponding contextual information to determine information associated with a vehicle, in accordance with some embodiments of the present disclosure. The method 800, at block B802, may include obtaining text data representing a question associated with a vehicle. For instance, the vehicle may use one or more microphones to generate audio data 104 representing speech from a passenger of the vehicle. The vehicle may then process the audio data 104, using the speech-processing component(s) 102, in order to generate the text data 106 representing the speech. In some examples, the speech may include a question associated with the vehicle. For instance, the speech may include a question associated with a component of the vehicle, a feature of the vehicle, maintenance associated with the vehicle, and/or the like.

The method 800, at block B804, may include determining, based at least on the text data, contextual information associated with the question. For instance, the vehicle may use the retrieval component 114 to retrieve the contextual information associated with the question. As described herein, in some examples, the retrieval component 114 may use embeddings associated with portions of information stored in the information database(s) 112 and an embedding associated with the question to retrieve the contextual information that is relevant to the question. However, in other examples, the retrieval component 114 may use one or more additional and/or alternative techniques to retrieve the contextual information from the information database(s) 112. The retrieval component 114 may then generate contextual data 116 representing the retrieved contextual information.

The process 800, at block B806, may include inputting the text data and data representing the contextual information into a language model. For instance, the vehicle may input the text data 106 and the contextual data 116 into the language model(s) 124. In some examples, to input the data, the prompt component 118 may initially use the text data 106 and the contextual data 116 to generate a prompt. The prompt component 118 may then input prompt data 122 representing the prompt into the language model(s) 124. In some examples, the vehicle may input additional data into the language model(s) 124, such as question/answer data 110 generated by the retrieval component 108 and/or contextual data 120 previously output by the language model(s) 124.

The method 800, at block B808, may include determining, using the language model, an output associated with the question. For instance, the language model(s) 124 may process the text data 106 and the contextual data 116 (e.g., the prompt data 122) and, based on the processing, output data 126 associated with the question. As described herein, the output data 126 may represent information associated with the question. The vehicle may then provide or communicate the information to the passenger using one or more components (e.g., speakers, displays, heads up displays, instrument panels, etc.) of the vehicle (or other machine). In some examples, the vehicle provides the information by outputting sound associated with the output data 126, where the sound includes one or more words representing the information. In some examples, the vehicle provides the information by causing display of content associated with the output data 126, where the content includes one or more words representing the information.

The question/answer interaction described with respect herein—such as with respect to methods 700 and 800—may be performed using a digital or personal assistant. For example, during conversation between a user and a digital assistant—such as during operation of a vehicle or other machine—the user may ask questions to the digital or personal assistant to learn more about the machine, to learn how to do maintenance, active/deactivate certain features, etc., and the responses from the digital or personal assistant may rely—at least in part—on the output data 126 from the language models 124 as generated using the system 100.

Example Autonomous Vehicle

Figure 9A:
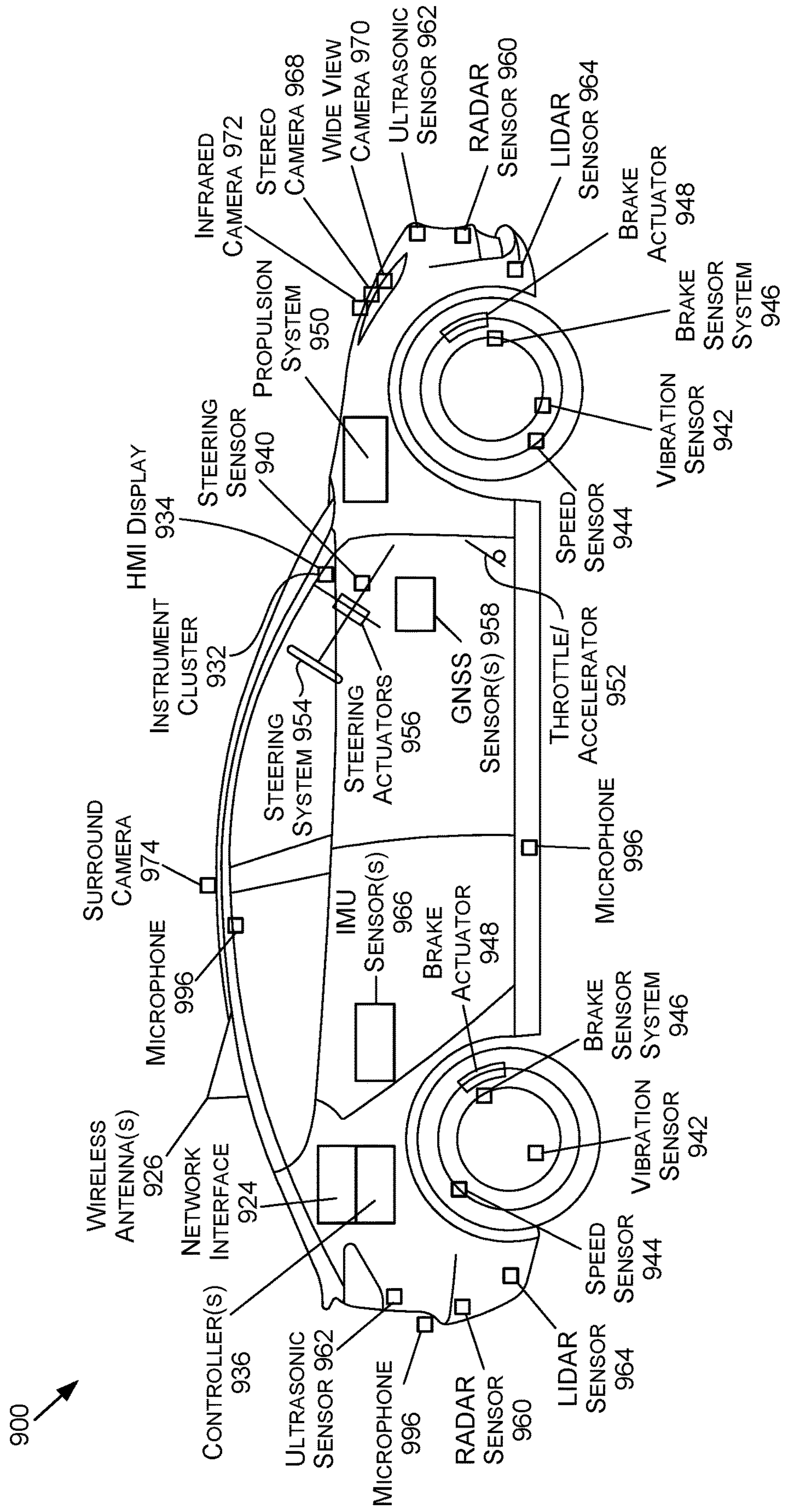
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
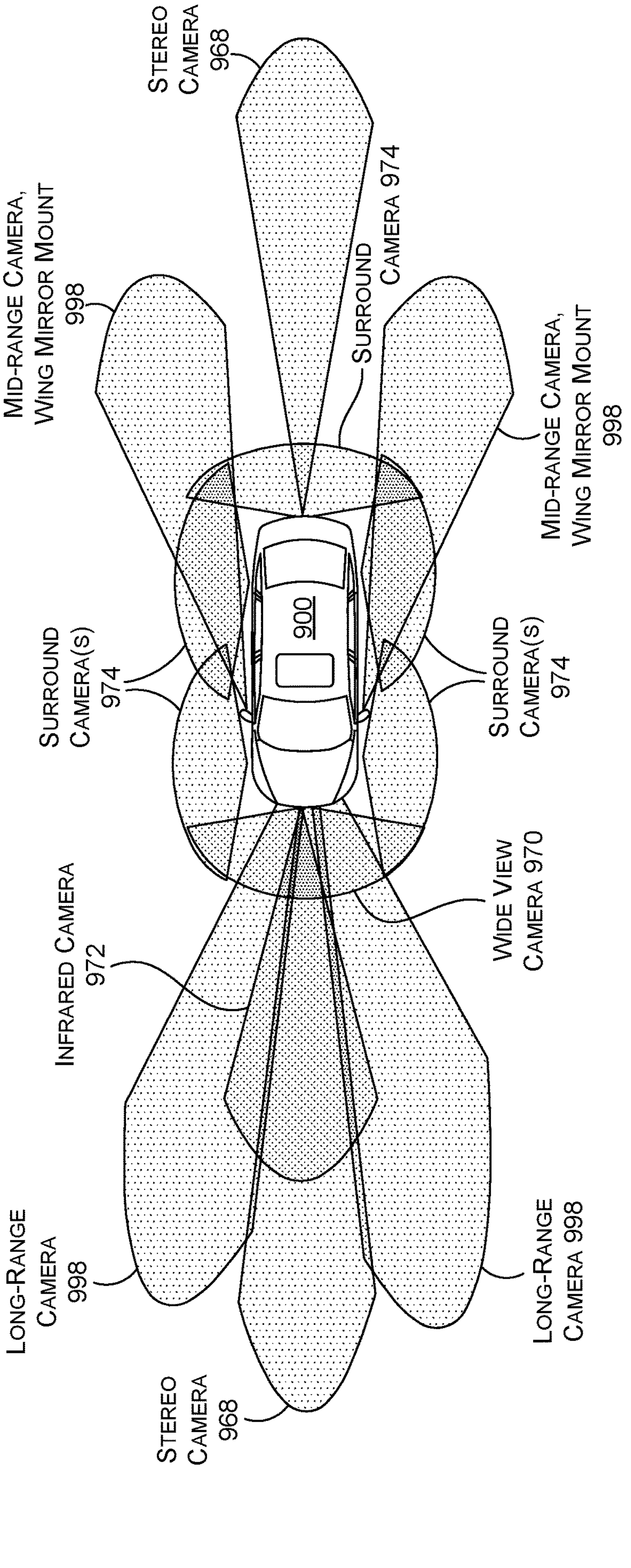
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
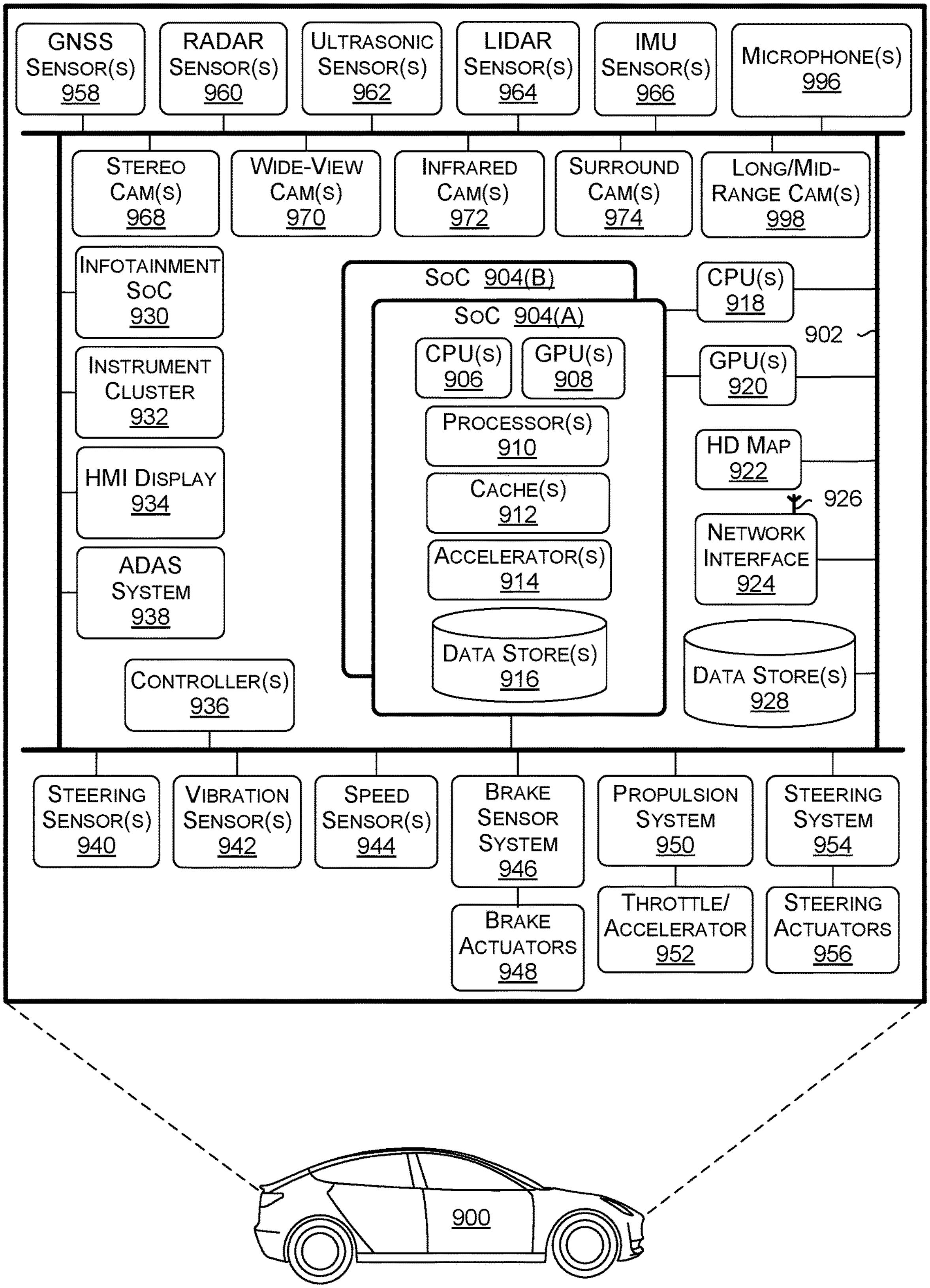
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear).

Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
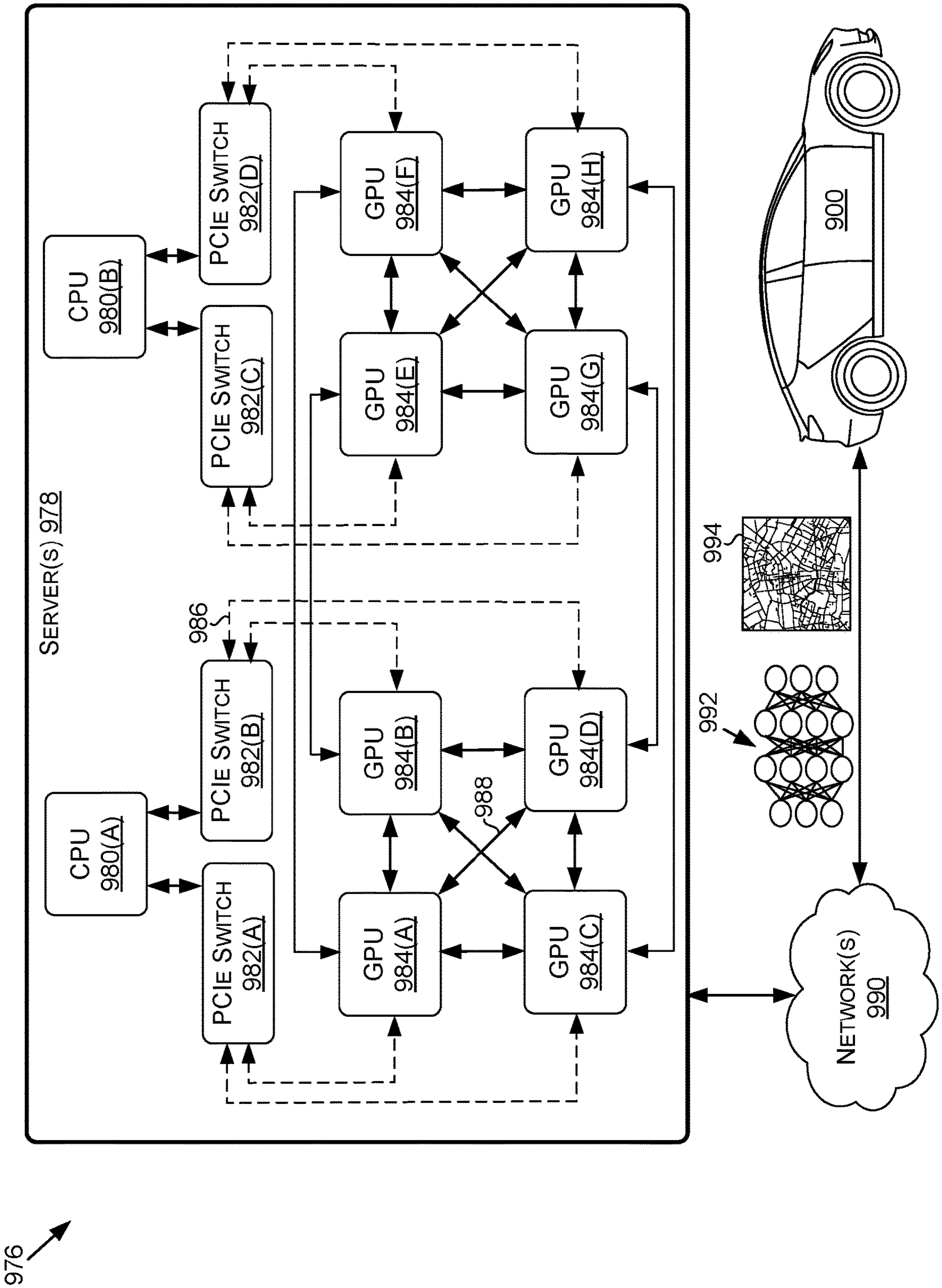
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
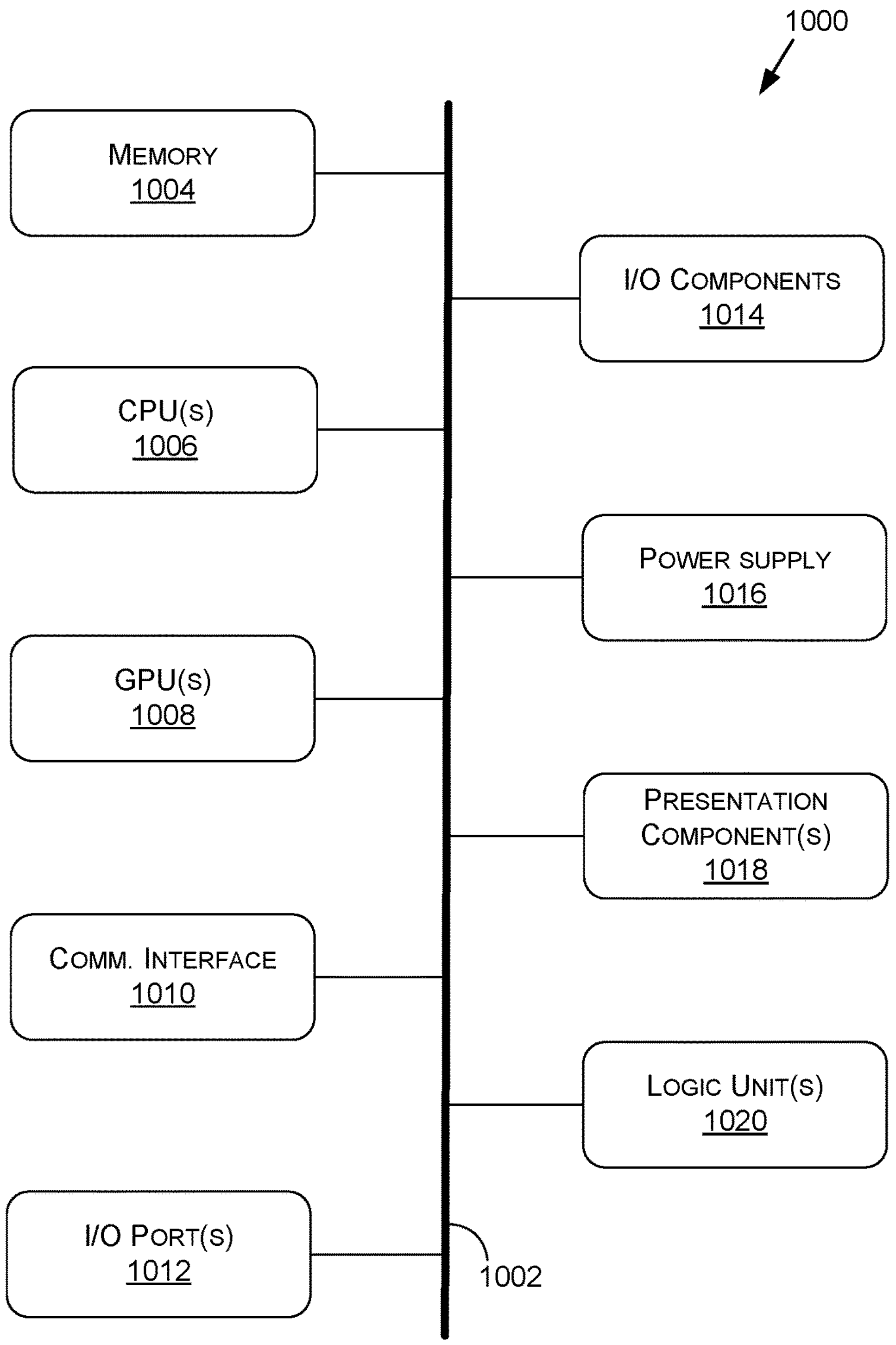
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
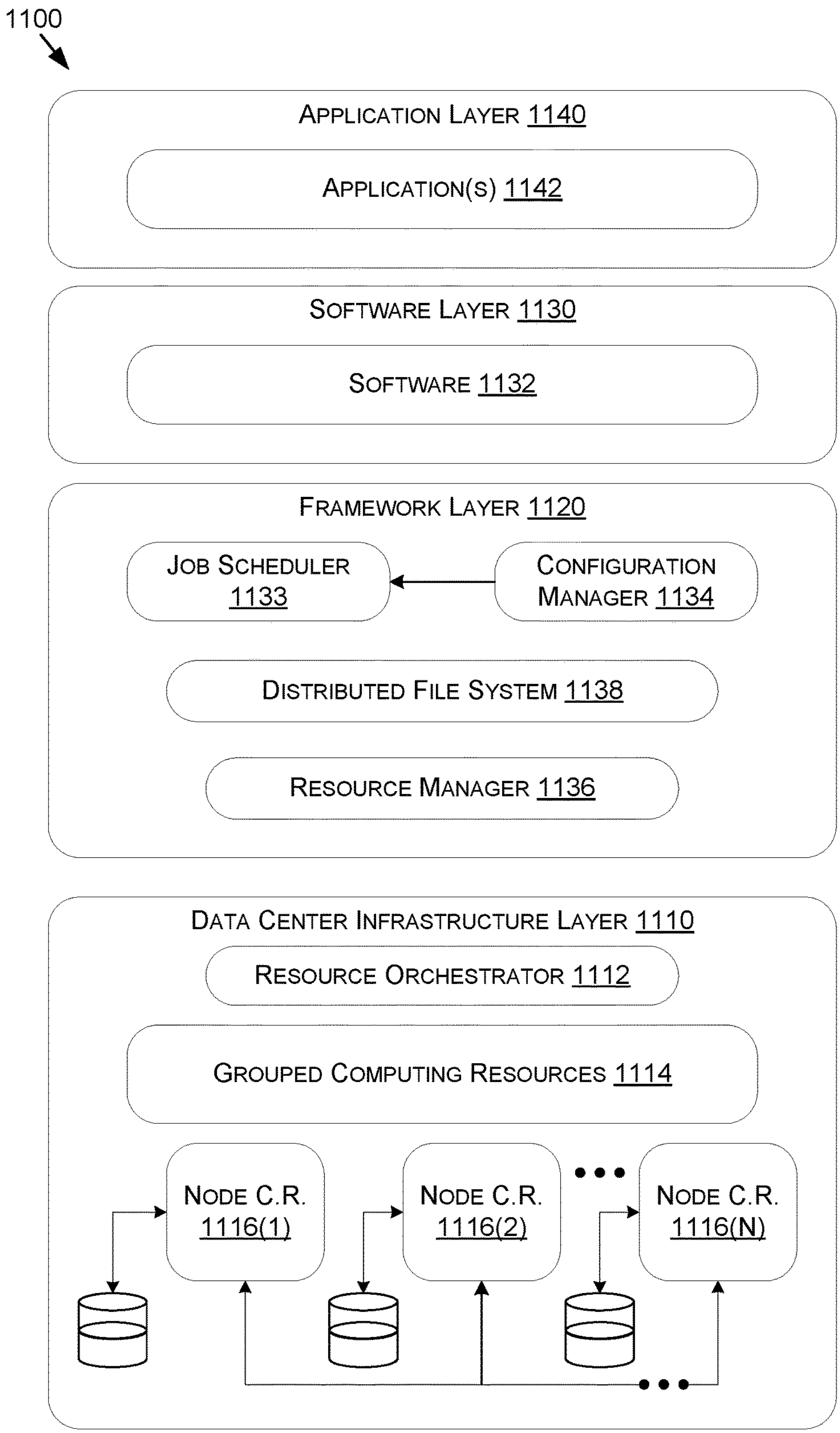
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

receiving, using one or more microphones of a machine, audio data representative of a question associated with the machine;

generating, based at least on the audio data, a first embedding representative of the question associated with the machine;

determining, based at least on the first embedding and one or more second embeddings associated with one or more question-and-answer pairs, at least one or more scores indicating one or more similarities of the one or more question-and-answer pairs to the question;

determining, based at least on the first embedding and one or more third embeddings associated with a manual corresponding to the machine, contextual information that includes one or more portions of the manual that are relevant to the question;

generating prompt data for one or more language models that is representative of at least first text associated with the question, second text associated with the one or more question-and-answer pairs that are arranged based at least on the one or more scores, and third text associated with the contextual information;

applying the prompt data to the one or more language models;

generating, based at least on the one or more language models processing the prompt data, output data corresponding to a response associated with the question; and outputting, using one or more components of the machine, content associated with the response.

2. The method of claim 1, wherein the one or more language models include at least one of a large language model (LLM), a generative language model, a generative pre-trained transformer model, or a generative transformer model.

3. The method of claim 1, wherein the manual includes at least a portion of a knowledge base corresponding to the machine.

4. The method of claim 3, wherein the one or more language models comprise one or more fixed language models, and the knowledge base comprises a live knowledge base.

5. The method of claim 1, wherein the determining the at least the one or more scores indicating the one or more similarities of the one or more question-and-answer pairs to the question comprises:

analyzing the first embedding with respect to the one or more second embeddings associated with the one or more question-and-answer pairs;

determining, based at least on the analyzing, the one or more similarities between the first embedding and the one or more second embeddings; and determining the one or more scores based at least on the one or more similarities.

6. The method of claim 1, wherein the prompt data is generated based at least on an order associated with the first text associated with the question, the second text associated with the one or more question-and-answer pairs, and the third text associated with the contextual information.

7. The method of claim 1, wherein:

the prompt data represents a prompt;

a first portion of the prompt includes the third text associated with the contextual information;

a second portion of the prompt includes the second text associated with the one or more question-and-answer pairs, the second portion of the prompt being after the first portion of the prompt; and a third portion of the prompt includes the first text associated with the question, the third portion of the prompt being after the second portion in the prompt.

8. The method of claim 1, further comprising:

prior to the generating the output data, determining, using the one or more language models and based at least on a second question associated with the machine, second output data associated with the second question, wherein the determining the response associated with the question is further based at least on the one or more language models processing the second output data.

9. The method of claim 1, wherein:

the question is associated with at least one of a component of the machine, a feature of the machine, or maintenance associated with the machine; and the response is representative of information associated with the at least one of the component of the machine, the feature of the machine, or the maintenance associated with the machine.

10. The method of claim 1, further comprising:

determining that at least a first score of the one or more scores is associated with a first question-and-answer pair of the one or more question-and-answer pairs, the first score indicating a first similarity between the question and the first question-and-answer pair; and determining that at least a second score of the one or more scores is associated with a second question-and-answer pair of the one or more question-and-answer pairs, the second score indicating a second similarity between the question and the second question-and-answer pair, wherein the prompt data represents the second question-and-answer pair followed by the first question-and-answer pair based at least on the first score and the second score.

11. The method of claim 1, wherein the determining the contextual information comprises:

analyzing the first embedding with respect to the one or more third embeddings associated with the manual;

determining, based at least on the analyzing, that the first embedding is similar to the one or more third embeddings; and determining the one or more portions of the manual to include as part of the contextual information based at least on the first embedding being similar to the one or more third embeddings.

12. A system comprising:

one or more processors to:

generate, based at least on audio data representative of a question associated with a machine, a first embedding representative of the question associated with the machine;

determine, based at least on the first embedding and one or more second embeddings associated with one or more question-and-answer pairs, at least one or more scores indicating one or more similarities of the one or more question-and-answer pairs to the question;

determine, based at least on the first embedding and one or more third embeddings associated with a manual corresponding to the machine, contextual information that includes one or more portions of the manual that are relevant to the question;

generate prompt data for one or more language models, the prompt data representative of at least first text associated with the question, second text associated with the one or more question-and-answer pairs that are arranged based at least on the one or more scores, and third text associated with the contextual information;

apply the prompt data to one or more language models;

generate, based at least on the one or more language models processing the prompt data, output data representing a response associated with the question; and output, using one or more components of the machine, content associated with the response.

13. The system of claim 12, wherein the manual corresponding to the machine includes one or more of:

an operator manual associated with the machine; or one or more operator manuals associated with one or more other machines.

14. The system of claim 12, wherein the contextual information is determined, at least, by:

determining, based at least on analyzing the first embedding with respect to the one or more third embeddings, that at least a third embedding of the one or more third embeddings is similar to the first embedding; and determining that the third embedding is associated with a portion of the one or more portions of the manual, the portion of the manual corresponding to the contextual information.

15. The system of claim 12, wherein:

a first portion of a prompt represented by the prompt data includes the third text associated with the contextual information;

a second portion of the prompt includes the second text associated with the one or more question-and-answer pairs;

a third portion of the prompt includes the first text associated with the question; and the prompt is generated based at least on an order associated with the first portion, the second portion, and the third portion.

16. The system of claim 12, wherein the one or more processors are further to:

prior to the output data being generated, determine, using the one or more language models and based at least on a second question associated with the machine, second output data associated with the second question, wherein the output data is further generated based at least on the second output data.

17. The system of claim 12, wherein:

the question is associated with at least one of a component of the machine, a feature of the machine, or maintenance associated with the machine; and the response includes information associated with the at least one of the component of the machine, the feature of the machine, or the maintenance associated with the machine.

18. The system of claim 12, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing real-time streaming;

a system for generating or presenting virtual reality (VR) content;

a system for generating or presenting augmented reality (AR) content;

a system for generating or presenting mixed reality (MR) content;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

19. The system of claim 12, wherein the one or more processors are further to determine an order for arranging the one or more question-and-answer pairs based at least on the one or more scores.

20. One or more processors comprising:

processing circuitry to:

generate, based at least on audio data representative of a question associated with a machine, a first embedding that represents the question associated with the machine;

determine, based at least on the first embedding and one or more second embeddings associated with one or more question-and-answer pairs, at least one or more scores associated with indicating one or more similarities of one or more question-and-answer pairs to the question;

determine, based at least on the first embedding and one or more third embeddings associated with a manual corresponding to the machine, contextual information that includes one or more portions of the manual that are relevant to the question;

generate prompt data for one or more language models, the prompt data representative of at least first text associated with the question, second text associated with the one or more question-and-answer pairs that are arranged based at least on the one or more scores, and third text associated with the contextual information;

apply the prompt data to one or more language models;

generate, based at least on the one or more language models processing the prompt data, a response associated with the question; and output the response using one or more components of the machine.

21. The processor of claim 20, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing real-time streaming;

a system for generating or presenting virtual reality (VR) content;

a system for generating or presenting augmented reality (AR) content;

a system for generating or presenting mixed reality (MR) content;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system incorporating one or more virtual machines (VMs);
a system implemented at least partially in a data center; or
a system implemented at least partially using cloud computing resources.

22. The one or more processors of claim 20, wherein:
the question is associated with at least one of a component of the machine, a feature of the machine, or maintenance associated with the machine; and
the response includes information associated with the at least one of the component of the machine, the feature of the machine, or the maintenance associated with the machine.

* * * * *